Patented Mar. 13, 1951

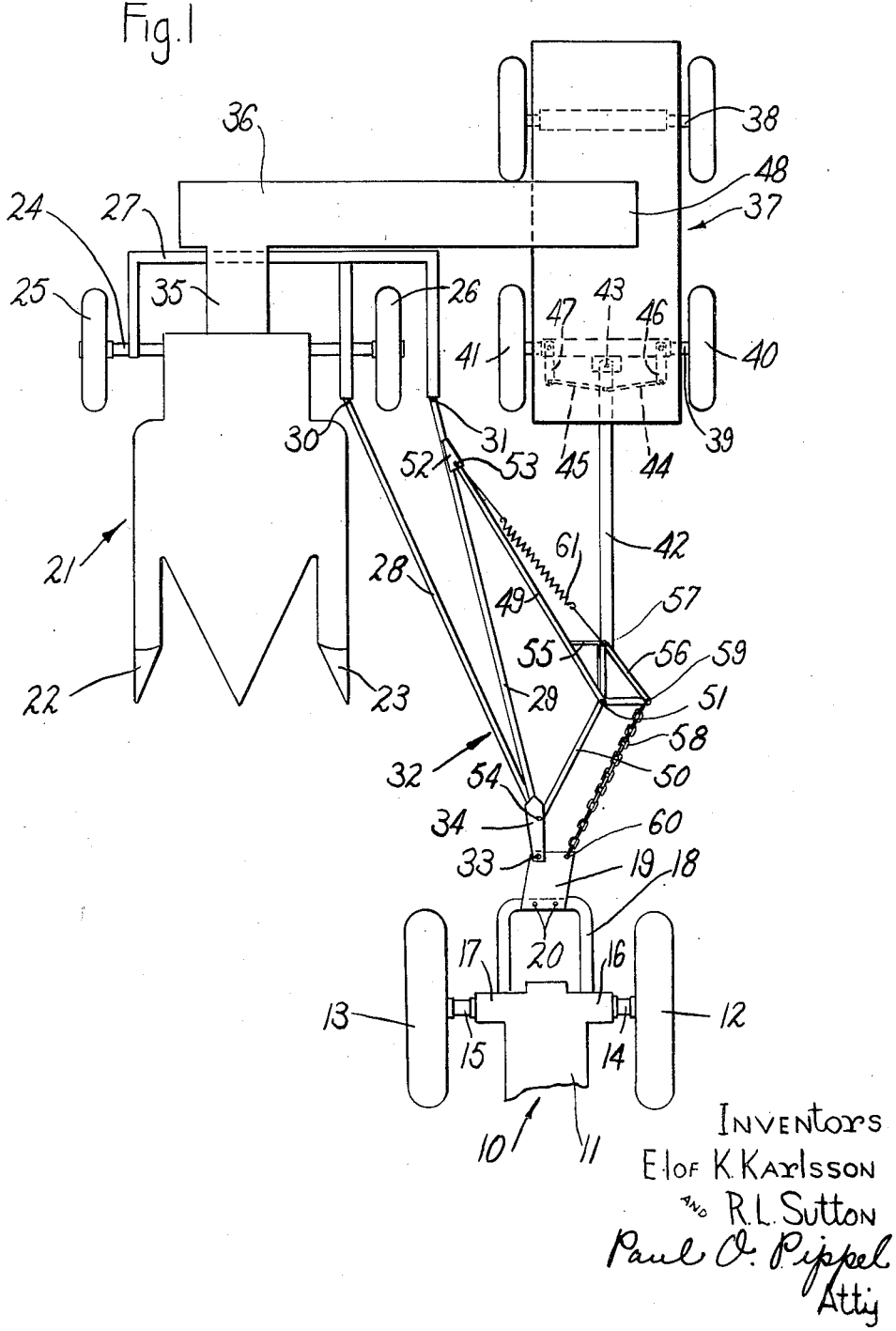

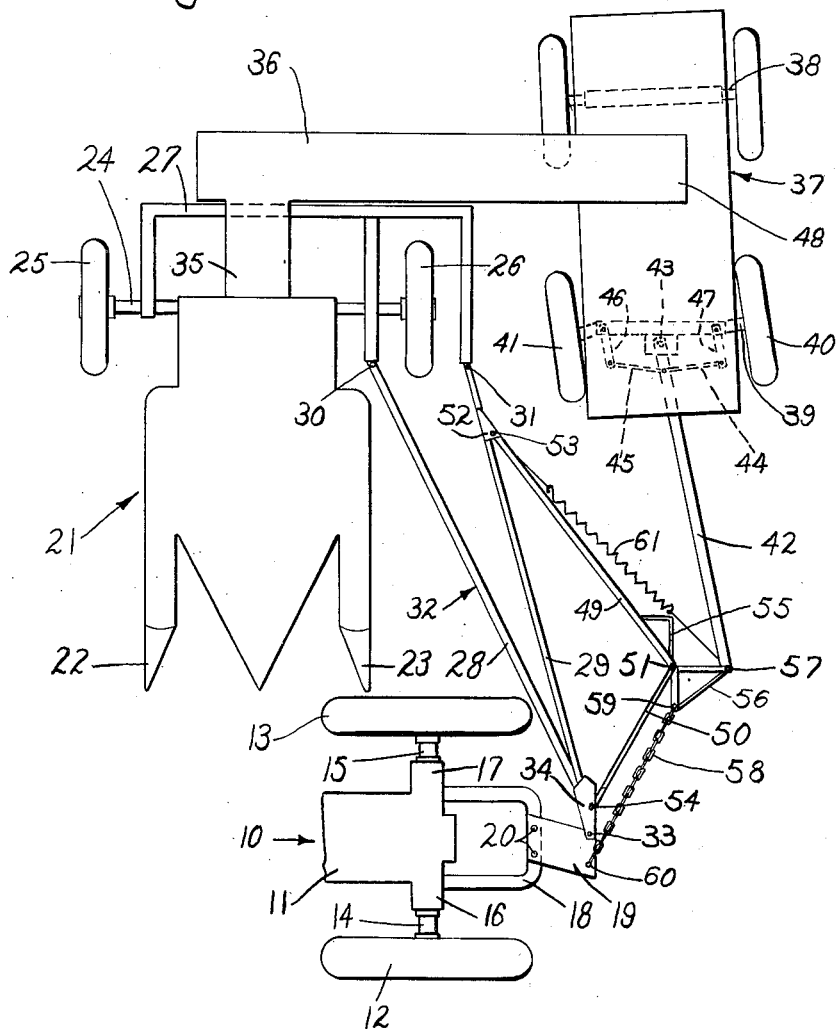

2,544,925

UNITED STATES PATENT OFFICE 2,544,925

HITCH FOR JOINING HARVESTER AND A WAGON TO A TRACTOR

Elof K. Karlsson, Moline, Ill., and Ralph L. Sutton, Davenport, Iowa, assignors to International Harvester Company, a corporation of New Jersey Application November 16, 1948, Serial No. 60,202

5 Claims. (Cl. 280—33.44)

1

This invention relates to a new and improved hitch for joining a harvester and a wagon to a tractor.

Harvesters, and particularly corn harvesters, require a wagon to be pulled adjacent thereto for receiving the ears of corn picked and snapped by the corn harvester. There are two types of corn pickers, one of which is a tractor-mounted picker in which case the wagon is generally pulled at the rear of the picker, and a pull-behind picker in which the wagon is positioned alongside the picker. It is this latter type of corn picker with which the present invention is concerned.

A tractor pull-behind picker and wagon involves the pulling of two separate vehicles, each of which must be capable of turning and both of which must closely follow the path of the tractor without running into one another. One of the requirements in a pull-behind picker is that the picker be laterally spaced from the line of draft of the tractor in order that the corn to be harvested is not run down by the pulling tractor. The discharge of the snapped ears of corn may be delivered to one side of the picker and thus the wagon to receive the harvested crop may be positioned directly to the rear of the tractor or even to the opposite side from which the picker is positioned. At the end of a row of corn the several joined vehicles must be turned around for movement in the opposite direction. Inasmuch as the tractor is pulling the corn picker and wagon, it turns first and the trailing vehicles follow in a relatively wide arc due to the fact that they are trailing a distance behind the tractor. Inasmuch as the corn picker and wagon turn on slightly different radii there is a tendency for one vehicle to run into the other. In order to avoid these collisions between the trailing vehicles many remedies have been tried, particularly the wider spacing of the wagon and the picker. This wide spacing creates considerable problems as to proper draft and also the problem of effectively delivering harvested ears of corn from the picker to a widely spaced apart wagon.

It is therefore a principal object of the present invention to provide a hitch means that will permit a close coupling of a trailing corn harvester and wagon which will automatically prevent the trailing vehicles from colliding with each other during turning of the entire unit.

An important object of this invention is the provision of means in a hitch for a pair of trailing vehicles to automatically separate the vehicles a greater distance during turning of the vehicles.

2

Another important object of this invention is to supply tractor hitch means which will normally pull a corn picker and wagon in close side by side relationship upon a forward pulling movement and which will automatically space the wagon from the picker a greater distance apart upon a turning of the pulling vehicle.

A still further important object of this invention is to provide a tractor hitch means for a pair of side by side trailing vehicles which will permit turning in one direction without effecting the spacing between the vehicles and which will provide for an automatic increasing of the spacing between the vehicles upon a turning in the other direction.

Other and further important objects of this invention will become apparent from the disclosures in the following specification and accompanying drawings.

In the drawings:

Fig. 1 is a top plan view of the hitch means of this invention showing the connection between the pulling tractor and the trailing corn picker and wagon.

Fig. 2 is a view similar to Fig. 1 with the pulling tractor shown turned through an angle of 90°.

As shown in the drawings, the reference numeral 10 indicates generaly a farm tractor having a longitudinally extending body portion 11, widely spaced rear traction wheeels 12 and 13 mounted on axles 14 and 15 respectively which in turn are carried in axle housings 16 and 17 extending laterally outwardly from the body or chassis 11. A drawbar 18 is attached at its forward end to the underside of the axle housings 16 and 17 and through the medium of this drawbar the tractor performs its job of pulling vehicles.

A plate 19 is fastened to the drawbar 18 by means of bolts or rivets or the like 20. The plate has substantial width and is adapted to receive the hitch or tongue members of trailing vehicles. In the present instance a corn picker 21 of the two-row type having forwardly extending gathering units 22 and 23 is carried on a wheel truck 24 having wheels 25 and 26. The corn picker 21 or first trailing vehicle is laterally spaced from the longitudinal line of draft of the tractor 10. The corn picker is provided with a frame structure 27 to which are attached pulling frame members 28 and 29 at 30 and 31 respectively. The connections 30 and 31 are hinge connections in order that the vehicle may be properly pulled by the tractor. The hitch frame 32 including the members 28 and 29 is hingedly fastened at 33 to the hitch plate 19 through the medium of a frame member adjoining bracket 34. The frame 32 is so arranged and constructed that the corn picker 21 will maintain its lateral spacing from the line of draft of the tractor as long as the tractor runs in a straight and forward direction.

The corn picker 21 is adapted to pick ears of corn and deliver them at 35 to a wagon elevator 36. In the device as shown the wagon elevator is transversely positioned with respect to the corn picker and is arranged to deliver picked and snapped ears of corn from the corn picker laterally to discharge over a wagon 37. The wagon 37 or second trailing vehicle is provided with a rear wheel truck 38 and a front wheel turning truck 39 having wheels 40 and 41. The wheel truck 39 is joined by a forwardly extending wagon tongue 42 at 43 and upon lateral angular movement of the tongue 42 the wheels 40 and 41 are similarly angularly displaced. This movement of the wheels 40 and 41 is accomplished through the means of connecting rods 44 and 45 joining the tongue 42 with the radius rods 46 and 47 of the wheels 40 and 41. The wagon 37 must be maintained substantially in its present relationship with respect to the corn picker in order that the discharge end 48 of the wagon elevator 36 will be over the wagon 37.

The pulling frame 32, often called an A frame, is provided with a member 49 and a member 50 in order to supply a support for attachment at 51 of the wagon 37. The frame member 49 is attached by means of a bracket plate or the like 52 at 53 and the frame member 50 is attached at 54 to the bracket 34. A guide or stop member 55 is fixedly attached to the inclined frame member 49 and provides a straight line abutment for a pivotable hitch extension 56.

The pivotable hitch extension 56 is triangular in shape and is pivoted at one angle thereof at 51 on the frame 32. The wagon tongue is pivotally attached at 57 to another angle of the hitch extension 56 and a collapsible link means in the form of a chain 58 joins the third angle 59 of the hitch extension 56 to the hitch plate 19 on the tractor drawbar 18 at 60. The attachments 33 and 60 on the hitch plate 19 are laterally spaced apart. Tension spring 61 is fastened at 53 to the frame 32 and at 57 to the juncture between the wagon tongue 42 and the pivotable hitch extension 56 at 57.

In normal operation the tractor pulls the vehicles, both the corn picker and wagon, down through a field of standing corn at which time the picker units 22 and 23 pick and snap ears of corn for lateral delivery by the elevator 36 to the spaced apart wagon 37. The hitch means, as previously described, acts to pull the vehicles in their relationship as shown in Fig. 1 and the vehicles maintain their proper spacing by the particular construction of the pulling frame 32. The spring 61 normally maintains the pivotable hitch extension 56 against the stop member 55. If, at the end of a row, it is desired to turn the tractor to the left, the corn picker 21 will automatically swing somewhat outwardly by reason of the inclined frame members 28 and 29 and the wagon 37 will conveniently follow the turning without any tendency for the vehicles to collide. However, should it be desired to turn the tractor to the right, in which position the tractor 10 is shown in Fig. 2, it is a normal tendency for the wagon 37 to turn inwardly toward and collide with the corn picker 21 because of its lateral offset position. The corn picker and wagon are moving about arcs of different radii and thus the collision of the vehicles without means to prevent it is entirely possible.

In this device, a right hand turning of the tractor 10 causes the rearwardly extending hitch plate 19 to pull the chain 58 considerably more than the pull on the frame 32 through the members 28 and 29 and thus the pivotable hitch extension 56 is rotated about its pivotable connection at 51 causing extension of the tension spring 61 and a lateral arcuate swinging movement of the hinge point 57 forwardly and laterally away from the stop 55 causing the wagon tongue 42 to be angularly shifted and thus the wagon wheels 40 and 41 to be turned in a left hand direction so that as the tractor 10 moves through a right hand turn the wagon 37 will actually move away from the corn picker 21, thus forestalling any colliding of the wagon with the corn picker or the corn picker hitch frame.

It will thus be seen that the corn picker and adjacent wagon may be close coupled without fear of the vehicles overrunning one another and turning of the entire unit may be had by reason of the additional automatic spacing of the wagon from the corn picker during such a turning.

Numerous details of construction may be varied throughout a wide range without departing from the principles disclosed herein and I therefore do not propose limiting the patent granted hereon otherwise than as necessitated by the appended claims.

What is claimed is:

1. A hitch means for joining a tractor and a first trailing vehicle and a material receiving second trailing vehicle in which the first trailing vehicle is laterally disposed from the line of draft of the tractor and the second trailing vehicle is positioned alongside the first trailing vehicle and substantially to the rear of the tractor comprising, frame connecting members hingedly attached to said first trailing vehicle and inclined laterally for connection to the tractor at a first point, said frame connecting members supporting a connecting point disposed laterally in a direction opposite the laterally disposed first trailing vehicle, an extensible hitch member pivotally attached at said laterally disposed connecting point, a tongue extending from the second trailing vehicle and attached to said extensible hitch member at a point spaced from the hinge mounting thereof, and collapsible link means attached at one end to said extensible hitch member at a point spaced from said tongue attachment and its pivotal mounting and attached at its other end to the tractor at a point laterally spaced from the frame member connection of the first trailing vehicle whereby upon turning of the tractor the collapsible link means pulls on said extensible hitch member causing rotation thereof and an outward swinging of the tongue to effect a separation of the second trailing vehicle from the first trailing vehicle during turning of the tractor in that one direction.

2. A device as set forth in claim 1 in which the extensible hitch member is in the form of a triangle being pivoted at one angle and joining the tongue and the collapsible link means at each of the other two angles.

3. A device as set forth in claim 2 in which stop means is provided for said triangular extensible hitch member preventing rotation thereof in one direction.

4. A device as set forth in claim 3 in which spring means is employed between said frame connecting member and said triangularly shaped extensible hitch member for normally maintaining said tongue in a straightforward direction.

5. Hitch means for an agricultural tractor with a drawbar and a laterally disposed first trailing vehicle with a transverse discharging means and a second trailing vehicle disposed in side by side relationship with said first trailing vehicle and adapted to receive material from the transverse discharging means, said hitch means comprising a relatively wide plate attached to said tractor drawbar and having laterally spaced connecting points, connecting frame members pivotally attached to said first trailing vehicle and laterally inclined to attachment to one of said points on the tractor wide plate, said connecting frame member having frame structure extending laterally away from said laterally disposed first trailing vehicle, a triangular shaped hinge extension member pivotally mounted at one angle on said laterally extending frame structure, a tongue for said second trailing vehicle hingedly attached to a second angle on said triangularly shaped hinge extension member, spring means positioned between said tongue attachment and a spaced apart point on said frame connecting member for normally holding said triangular extensible hitch member in a position defining a straightforward disposition of the tongue, and chain means joining the third angle of said triangular shaped extensible hitch member and a laterally spaced connecting point on said tractor wide plate whereby upon turning of the tractor in one direction the chain collapses and the first trailing vehicle and the second trailing vehicle remain in constant spaced apart relationship and whereupon the tractor being turned in the opposite direction, the chain means causes a rotation of the triangular shaped extensible hinge member causing a movement of the tongue through an angular displacement and thus causing an automatic separation of the second trailing vehicle from the first trailing vehicle upon turning movement of the tractor in this direction.

ELOF K. KARLSSON.
RALPH L. SUTTON.

REFERENCES CITED

The following references are of record in the file of this patent:

UNITED STATES PATENTS

| Number | Name | Date |
|---|---|---|
| 1,935,897 | Paradise et al. | Nov. 21, 1933 |
| 1,980,046 | Frederiksen | Nov. 6, 1934 |
| 2,255,281 | Dort | Sept. 9, 1941 |